United States Patent

Howard et al.

[11] Patent Number: 5,268,674
[45] Date of Patent: Dec. 7, 1993

[54] MECHANICALLY LATCHING MOUSE BUTTON

[75] Inventors: Robert A. Howard, Mountain View; Roy J. Riccomini, Los Altos, both of Calif.

[73] Assignee: Apple Computer, Inc., Cupertino, Calif.

[21] Appl. No.: 829,785

[22] Filed: Jan. 31, 1992

[51] Int. Cl.$^5$ .................................... G09G 3/02
[52] U.S. Cl. ........................ 345/163; 200/318; 200/332; 200/339; 345/156
[58] Field of Search ............... 340/706, 709, 710, 711; 341/22, 23; 200/330, 331, 332, 332.1, 332.2, 337, 338, 291, 318, 318.1, 319, 322, 324, 325, 339, 343, 556, 558, 553

[56] References Cited

U.S. PATENT DOCUMENTS

| | | | |
|---|---|---|---|
| 4,242,552 | 12/1980 | Tibolla | 200/330 |
| 4,520,240 | 5/1985 | Swindler | 340/711 |
| 4,533,805 | 8/1985 | Fujinami et al. | 200/330 |
| 4,882,458 | 11/1989 | Berg et al. | 200/322 |
| 4,942,276 | 7/1990 | Kato | 200/332 |
| 5,059,754 | 10/1991 | Kaichi et al. | 200/332.1 |

Primary Examiner—Ulysses Weldon
Assistant Examiner—Matthew Luu
Attorney, Agent, or Firm—Robert T. Martin

[57] ABSTRACT

A mechanically latching button for a cursor control device such as a mouse or trackball is disclosed. The latching mechanism improves performance during dragging operations, while not affecting the button's rapid response needed for ordinary clicking. A first embodiment uses a stepped button. In a second embodiment, a sliding latch button is used. In a third embodiment, a push latch button is used. In a fourth embodiment, a snap action latch with a latch release button is used.

4 Claims, 10 Drawing Sheets

MECHANICALLY LATCHING MOUSE BUTTON

BACKGROUND OF THE INVENTION

This invention is in the field of digital computers and their related peripheral equipment. In a preferred embodiment, the present invention comprises a mechanically latching button on a cursor control device such as a mouse.

In typical use, movements of a cursor control device such as a trackball or mouse are tracked by the computer system and displayed as corresponding movements of a cursor or other graphics indicator on a display screen. A button on the cursor control device is used to select and manipulate items on the display. The user positions the cursor by moving the mouse or trackball and clicks on words, objects, or items by quickly pressing and releasing the button. This is known as clicking. Many computer systems, including the Apple Macintosh, denote different actions by multiple rapid clicks at the same location. For example, in some text editing operations, a single click positions the editing cursor at the clicked location, two rapid clicks at the same location select the word at the cursor location, and three rapid clicks at the same location select the entire line of text at the cursor location. It is therefore very important for the user to be able to click the button quickly.

Another basic operation is known as dragging. In this operation, the user positions the cursor over an object of interest by moving the mouse or trackball. The user then presses the button and moves to a new position while holding the button down. In a text based application such as word processing, this dragging operation may move all the text from a first cursor position to a second cursor position. In a drafting application, dragging may have the effect of moving an object such as the drawing of a wall from one location to another. In a graphics based user interface, dragging the icon representing a file from an initial position to a new position may have the effect of moving a disk file from one subdirectory or disk to another.

Dragging is cumbersome, especially when used with large graphics displays where the button must be held down for a relatively long period of time while the mouse or trackball is moved with some precision over a large distance. For example, in a computer system using a graphics interface, deleting a disk file is accomplished by dragging the icon representing the disk file onto the icon representing a trash can. If the user is dragging a file from one corner of a large display to the trash can icon in the lower far corner of the display and accidentally lifts up on the button even momentarily, this can result in placing the file in an undesirable or indeed unknown location.

The prior art does not provide a solution to this difficulty.

BRIEF SUMMARY OF THE INVENTION

The present invention comprises a mechanical latching button means applicable to cursor control devices such as mice and trackballs that solves the noted problems involved in dragging operations, without compromising the fast action needed for clicking operations. The present invention does not increase the electronic complexity of the device, and provides the user with visual and tactile feedback indicating when the button is mechanically latched. A first embodiment uses a stepped button. In a second embodiment, a sliding latch button is used. In a third embodiment, a push latch button is used. In a fourth embodiment, a snap action latch with a latch release button is used.

Additional features and advantages of the present invention will be understood by referring to the following detailed description of the invention, the drawings, and the appended claims.

BRIEF DESCRIPTION OF THE DRAWINGS

FIG. 9a is a cross section of the embodiment of FIG. 8a;

FIG. 12a is a cross section of the embodiment of FIG. 11a; and

DETAILED DESCRIPTION OF THE INVENTION

Figure 1:
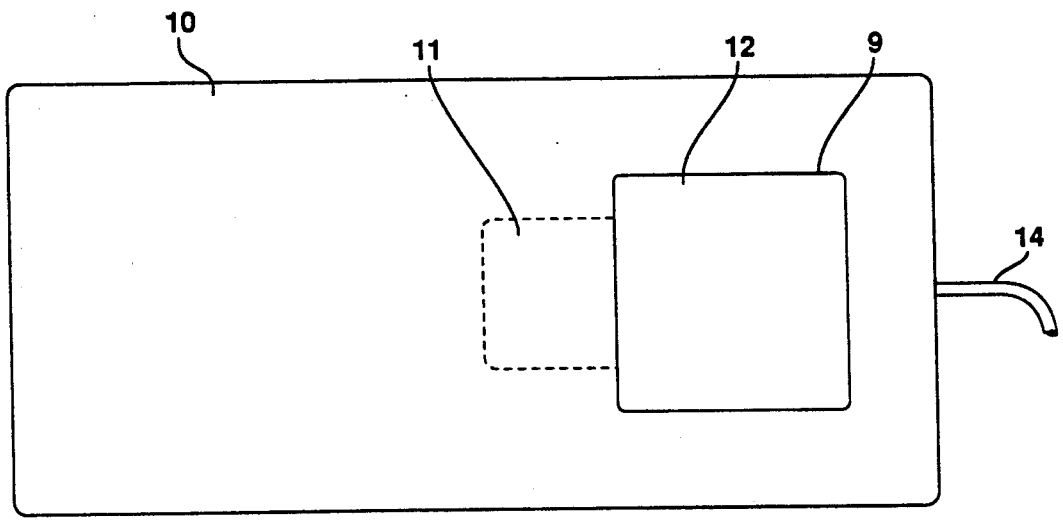
FIG. 1 is a top view of a mouse (prior art)

FIG. 1 shows a known mouse. Top piece 10 has an opening 9 for button 12. Button 12 is a single piece of plastic which has a mounting tab 11 extending from it. Typically, this mounting tab is cemented, snapped, welded, or heat staked to top piece 10. Cable 14 connects the mouse to a computer system.

Figure 2:
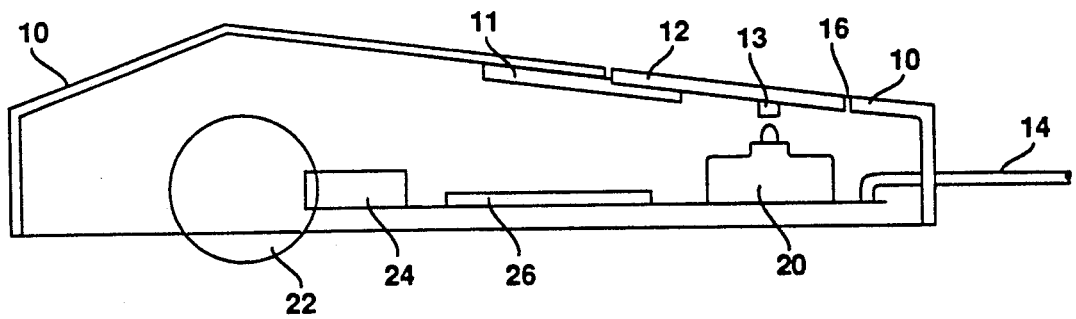
FIG. 2 is a cross section view of a mouse (prior art)

FIG. 2 is a cross section of the mouse shown in FIG. 1. In normal operation, the flexibility of plastic mounting tab 11 holds button 12 in its normal position, but allows the button to be depressed, flexing mounting tab 11, until switch pad 13 contacts and activates momentary action switch 20. When depressed, the gap between edge 16 of mouse button 12 opposite mounting tab 11 and mouse top 10 provide both visual and tactile feedback to the user that the mouse button is down. When button 12 is released, mounting tab 11 returns the button to its original position, releasing switch 20.

As the mouse is moved over a surface, the rotation of mouse ball 22 is sensed by motion sensing means 24 and converted to motion signals. Processing means 26 combines these motion signals with the switch signal from switch 20 and sends this information along connecting cable 14. Power for the mouse's electronics is also supplied over this cable. As motion sensing and signal processing means 22, 24, and 26 are not part of the present invention, they are not shown in successive figures and are not discussed further.

Figure 3:
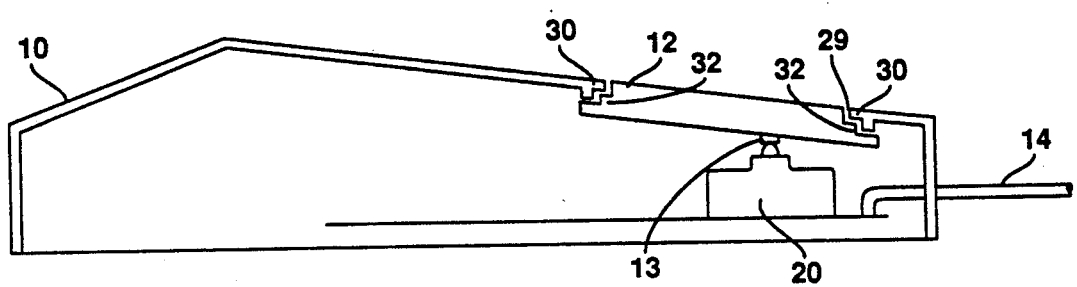
FIG. 3 is a cross section of a first embodiment of the present invention.
Figure 4:
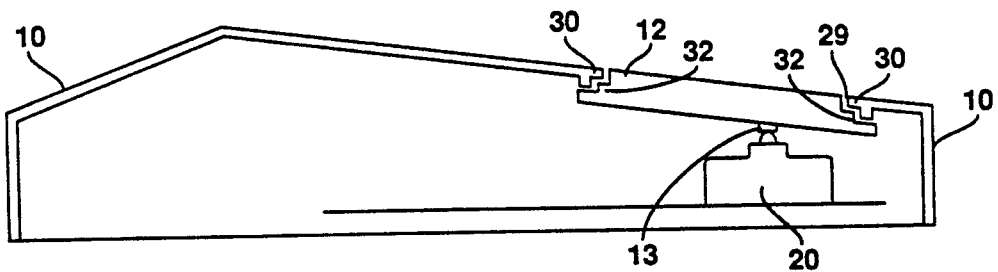
FIG. 4 shows the embodiment of FIG. 3 in a latched position.

FIG. 3 shows a first embodiment of the present invention using a sliding latch button. The latch button is shown in a first, unlatched state. FIG. 4 shows the sliding latch button in a latched state. This embodiment differs from the mouse of FIGS. 1 and 2 in that mounting tab 11 is not used to secure mouse button 12 and provide restorative force to return it to its original position when released by the operator. In this embodiment, the restorative force of momentary action switch 20 returns button 12 to its original position when the button is released. Mouse button 12 has a plurality of steps 32 that can be engaged in ledges 30 in mouse top 10. In operation, mouse button 12 is pressed down, switch pad 13 activates switch 20, and, when released, the restorative force of switch 20 returns button 12 to its original position. When button 12 is pushed down to activate switch 20 and moved slightly forward or backward, steps 32 engage with ledges 30, and the mouse button is held in place at an angle by the restorative force of switch 20, keeping switch 20 in its activated state. In this mechanically latched state, shown in FIG. 4, gap 29 between the depressed edge of mouse button 12 and mouse top 10 provides tactile and visual feedback to the user that the mouse button is depressed. When button 12 is slightly depressed and slid back to its original position, steps 32 disengage from ledges 30, and, when button 12 is released the restorative force of switch 20 returns button 12 to its original position. In this original position, mouse button 12 may be pressed and released rapidly in place to achieve multiple rapid clicks, without interference from or with the latching mechanism.

Figure 5:
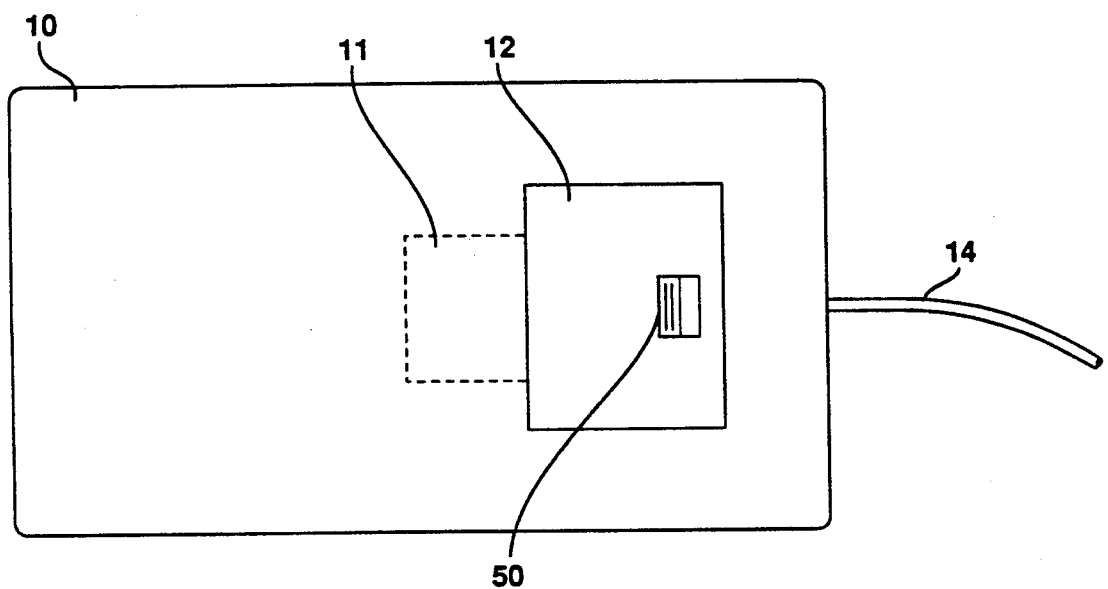
FIG. 5 is a top view of a second embodiment of the present invention.
Figure 6:
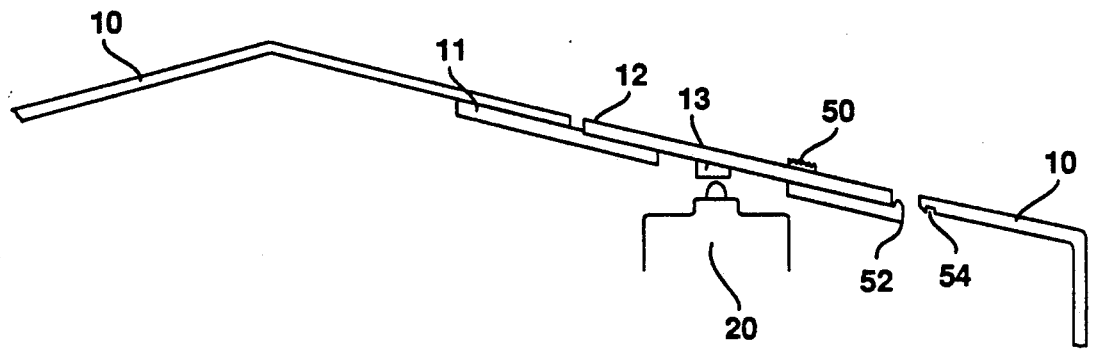
FIG. 6 is a cross section of the embodiment of FIG. 5.
Figure 7:
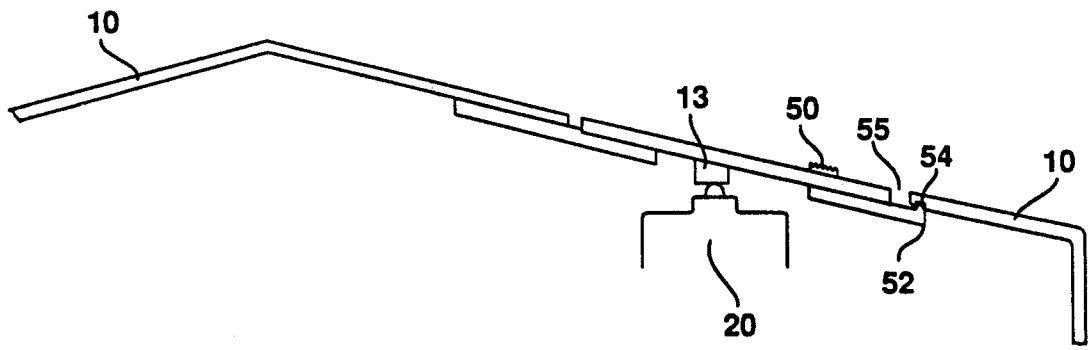
FIG. 7 shows the embodiment of FIG. 5 in a latched position.

FIG. 5 is a top view of a second embodiment of the present invention, this embodiment using an inset button 50. Mouse button 12 is mounted to mouse top 10 by mounting tab 11. Inset into mouse button 12 is a small sliding inset button 50. FIG. 6 shows a cross section of this second embodiment. In operation, button 12 is depressed, flexing mounting tab 11, and switch pad 13 engages and operates momentary action switch 20. When mouse button 12 is released, mounting tab 11 returns the button to its original position, releasing the switch. In latching operations shown in FIG. 7, button 12 is depressed and sliding latch button 50 is moved forward, so that catch 52 engages recess 54 in mouse top 10, holding button 12 in a depressed position with switch 20 engaged. While in this mechanically latched state, the gap between depressed edge 55 of mouse button 12 and mouse top 10 provides tactile and visual feedback to the user that the mouse button is depressed. The position of sliding latch button 50 also provides additional tactile and visual feedback to the user to indicate the latched state. When button 12 is slightly depressed, catch 52 and recess 54 latched state. When button 12 is slightly depressed, catch 52 and recess 54 disengage, and sliding latch button 50 may be moved back, allowing mouse button 12 to return to its original position. When in this original position, mouse button 12 may be pressed and released rapidly for multiple rapid clicks, without interference from the latching mechanism.

Figure 8A:
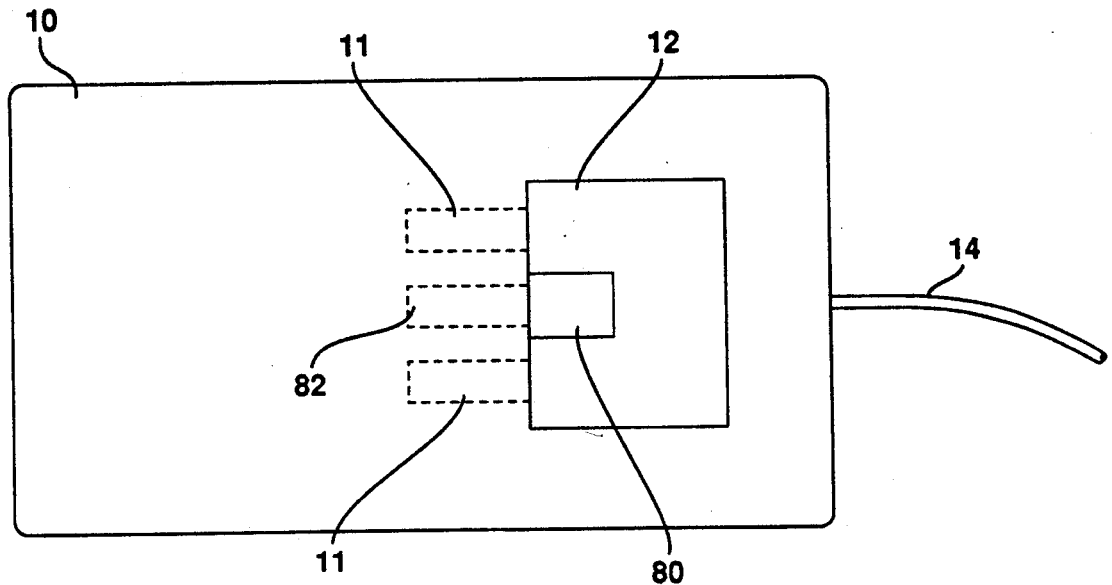
FIG. 8a is a top view of a third embodiment of the present invention.
Figure 8B:
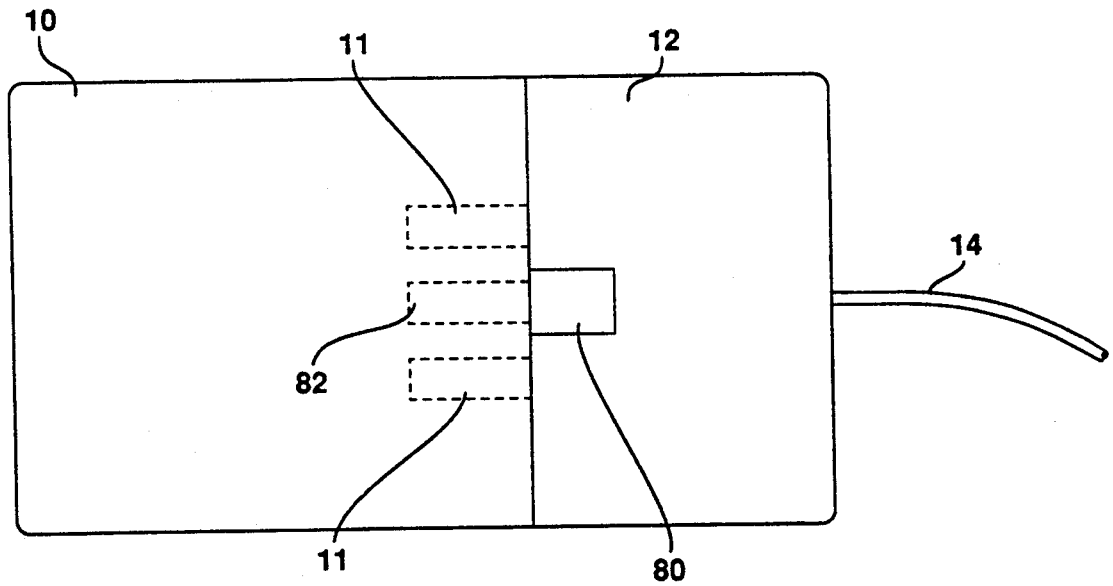
FIG. 8b is a top view of the third embodiment of the present invention using a different button style.
Figure 9A:
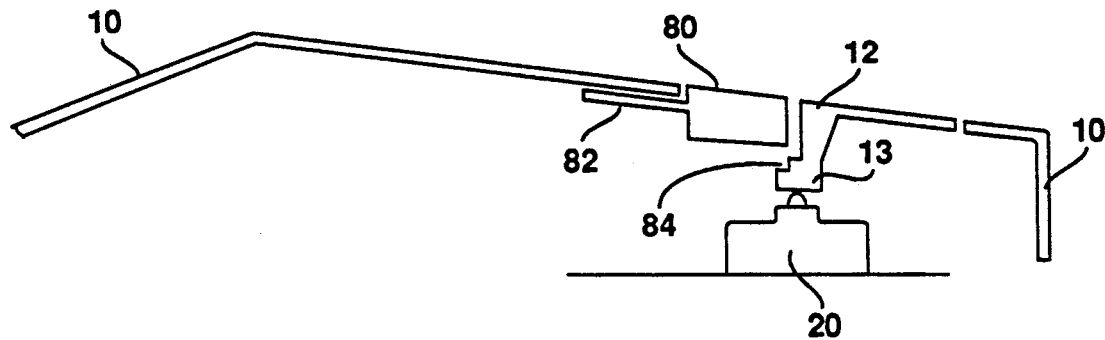
Figure 9B:
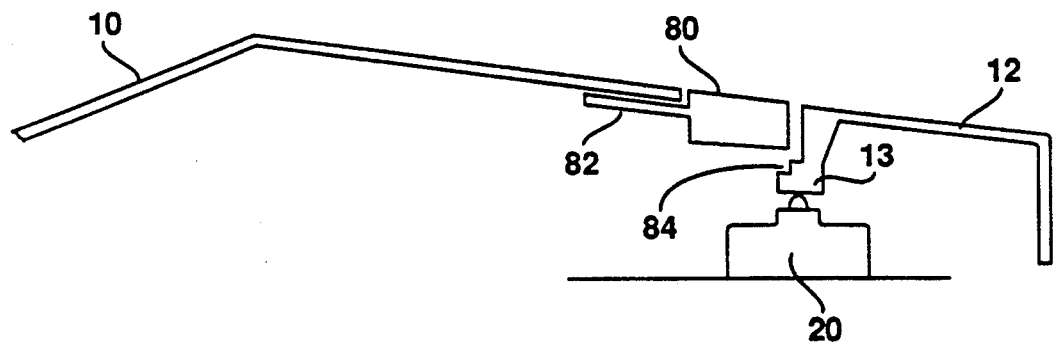
FIG. 9b is a cross section of the embodiment of FIG. 8b.
Figure 10:
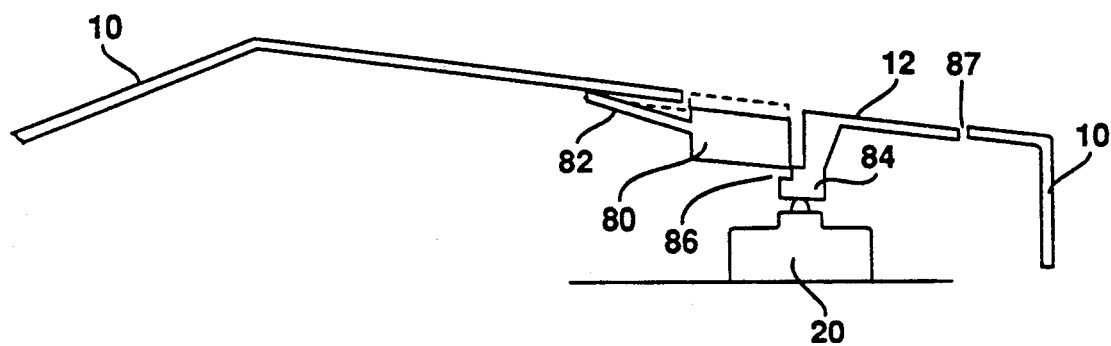
FIG. 10 shows the embodiment of FIG. 8a in a latched position.

FIGS. 8a and 8b are top views of a third embodiment of the present invention using different button styles, this embodiment using a push latch. Mouse button 12 is mounted to mouse top 10 by a plurality of mounting tabs 11. Latch button 80 is mounted to mouse top by its mounting tab 82. FIGS. 9a and 9b are side views of this push latch embodiment. In operation, button 12 is depressed, flexing mounting tabs 11, and switch pad 13 engages and operates momentary action switch 20. When mouse button 12 is released, mounting tabs 11 return the button to its normal position, releasing the switch. In latching operations, shown in FIG. 10, when latch button 80 is depressed, mouse button 12 is also depressed, flexing its mounting tab 11. Lower edge 86 of latch button 80 engages step 84 in mouse button 12, holding mouse button 12 in a depressed position. While in this mechanically latched state, gap 87 between the depressed edge of mouse button 12 and mouse top 10, and the depressed position of latch button 80 provide tactile and visual feedback to the user that the mouse button is depressed and latched. When in the latched position, pressing mouse button 12 releases the lower edge of latch button 80 from step 84, allowing latch button 80 to return to its original position. When in this original position, mouse button 12 may be pressed and released rapidly for multiple rapid clicks, without interference from the latching mechanism.

Figure 11A:
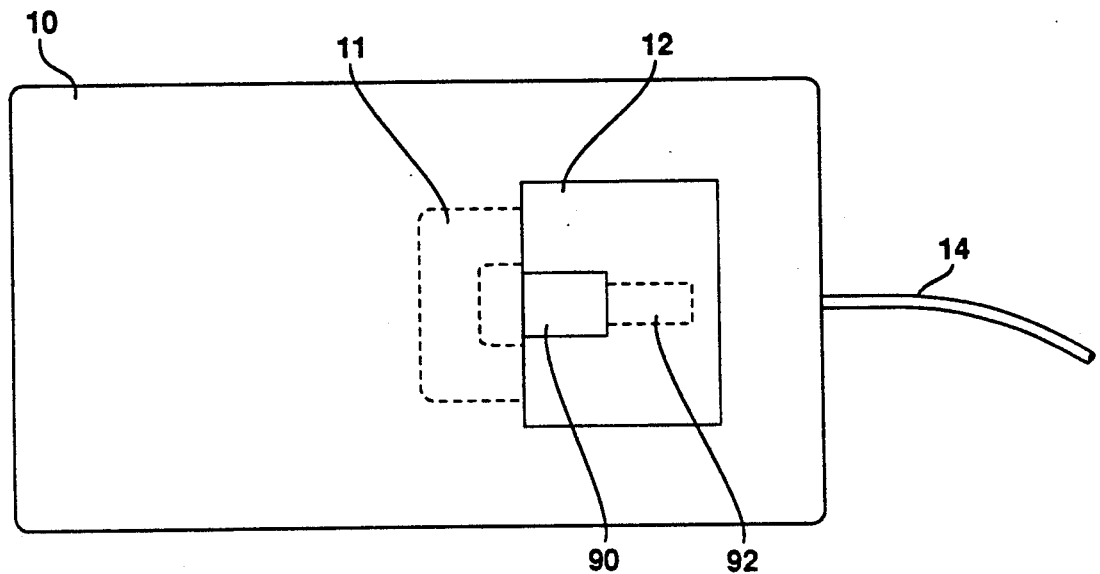
FIG. 11a is a top view of a fourth embodiment of the present invention.
Figure 11B:
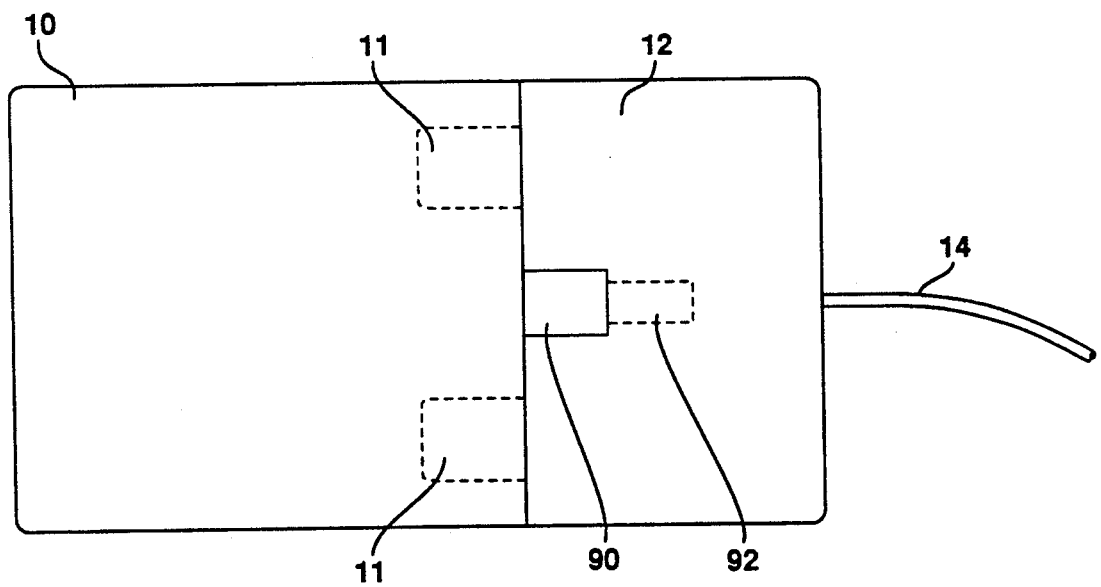
FIG. 11b is a top view of the fourth embodiment of the present invention using a different button style.
Figure 12A:
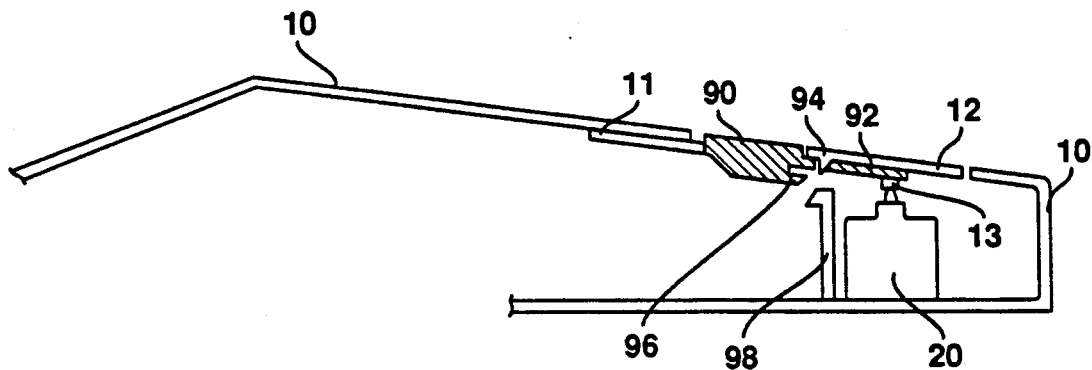
Figure 12B:
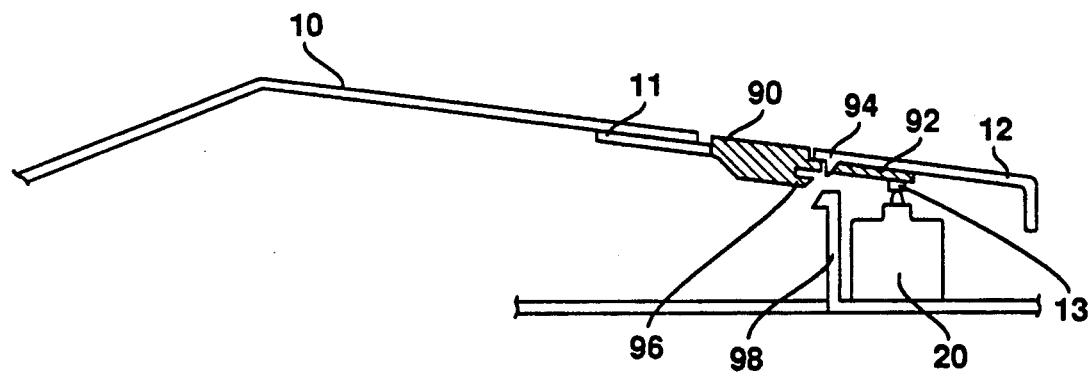
FIG. 12b is a cross section of the embodiment of FIG. 11b.
Figure 13:
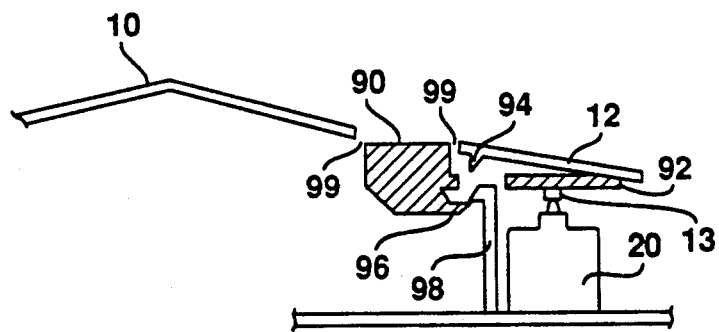
FIG. 13 shows the embodiment of FIG. 11 in a latched position.

FIGS. 11a and 11b are top views of a fourth embodiment of the present invention showing different button styles, this fourth embodiment using a snap action latch. Mouse button 12 is mounted to mouse top 10 by its mounting tab 11. Latch button 90 is mounted to mouse button 12 by its mounting tab 92. In normal operation as shown by cross section view FIGS. 12a and 12b, mouse button 12 is depressed, flexing mounting tab 11 and moving switch pad 13, which engages and operates momentary action switch 20. When mouse button 12 is released, mounting tab 11 returns the button to its normal position, releasing switch 20. In latching operations, shown by FIG. 13, when latch button 90 is depressed, top latch 96 engages bottom latch 98, flexing tab 92 which engages and operates momentary action switch 20. While in this mechanically latched state, gap 99 between the depressed edge of latch button 90 and mouse button 12 provide tactile and visual feedback to the user that the latching mechanism is engaged. When mouse button 12 is pressed further, release lever 94 presses on bottom latch 98, causing it to deflect, disengaging latch 96, and allowing latch button 90 to return to its original position, releasing switch 20. When in this original position, mouse button 12 may be pressed and released rapidly for multiple rapid clicks, without interference from the latching mechanism.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential techniques of this invention.

What is claimed is:

1. In a cursor control device having a body with a top piece and a base piece, the top piece having moveable button means, the button means pivoting downward toward the base piece from a normal position to a depressed position, and a momentary action switch disposed in the base piece, the switch actuated by the downward pivoting of the button means, a selectively operable mechanical button latching means comprising:

an opening in the top piece, the button means further comprising a button fitting the opening and having a plurality of steps with one step being substantially the same size as the opening and successive lower steps, these lower steps being oriented toward the bottom piece, being successively larger in size, the button means being further capable of forward and rearward translation in the opening, so that when the button is pressed down and translated forward or rearward, one of the lower steps of the button engages in the opening, holding the button in its offset position at an angle with respect to the top piece, maintaining the switch in its activated position for a user-determined period of time.

2. In a cursor control device having a body with a top piece and a base piece, the top piece having moveable button means, the button means pivoting downward toward the base piece from a normal position to a depressed position, and a momentary action switch disposed in the base piece, the switch actuated by the downward pivoting of the button means, a selectively operable mechanical button latching means comprising:

primary and secondary buttons sized to fit together adjacent to the top piece, the primary button having first latching means extending from the bottom of the primary button, the secondary button having second latching means extending from the bottom of the secondary button for engaging the first latching means on the primary button, whereby pressing the secondary button while the primary button is depressed engages the first and second latching means in the primary and secondary buttons, so that the primary and secondary buttons are held in their depressed positions, thus holding the switch in its active position, until the primary button is pressed again, releasing both primary and secondary buttons and returning the switch to its normal state.

3. The device of claim 2 wherein the primary and secondary buttons are fitted into an opening in the top piece.

4. In a cursor control device having a body with a top piece and a base piece, the top piece having moveable button means, the button means pivoting downward toward the base piece from a normal position to a depressed position, and a momentary action switch disposed in the base piece, the switch actuated by the downward pivoting of the button means, a selectively operable mechanical button latching means comprising:

lower catch means extending from the base piece;

primary and secondary buttons sized to fit together adjacent the top piece, both primary and secondary buttons being flexibly mounted to the top piece;

upper catch means extending from the primary button toward the base piece; and upper catch release means extending from the secondary button toward the base piece, the primary button having an original position in which the switch is not activated and having first and second depressed positions in which the switch is activated, the primary button when placed in its first depressed position activating the switch but not engaging the upper catch means extending from the button with the lower catch means extending from the base, the primary button when moved from the first depressed position to the second depressed position causing the upper catch means extending from the primary button and the lower catch means extending from the base to engage, holding the switch is held in its activated position, and the secondary button when depressed releasing the upper and lower catch release means to disengage the lower catch means extending from the base from the upper catch means extending from the primary button, releasing the primary button and the switch.

* * * * *